(12) United States Patent
Gogic (10) Patent No.: US 8,503,465 B2
(45) Date of Patent: Aug. 6, 2013

(54) PRIORITY SCHEDULING AND ADMISSION CONTROL IN A COMMUNICATION NETWORK

(75) Inventor: Aleksandar Gogic, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 618 days.

(21) Appl. No.: 12/211,718

(22) Filed: Sep. 16, 2008

(65) Prior Publication Data

US 2009/0080451 A1    Mar. 26, 2009

Related U.S. Application Data

(60) Provisional application No. 60/973,137, filed on Sep. 17, 2007.

(51) Int. Cl.
*H04L 12/28* (2006.01)
*H04L 12/56* (2006.01)

(52) U.S. Cl.
USPC .......................................................... 370/412

(58) Field of Classification Search
USPC ................. 370/412, 235, 312, 329, 427, 229, 370/444, 413, 231, 232, 236, 394, 517, 468; 379/242, 266; 709/224, 232; 455/446, 509, 455/458, 519, 414, 452
See application file for complete search history.

(56) References Cited

U.S. PATENT DOCUMENTS

| | | | |
|---|---|---|---|
| 5,467,388 A | 11/1995 | Redd, Jr. et al. | |
| 5,517,495 A * | 5/1996 | Lund et al. | 370/399 |
| 5,592,542 A * | 1/1997 | Honda et al. | 379/266.05 |
| 6,167,057 A * | 12/2000 | Kishigami et al. | 370/445 |
| 6,484,145 B1 | 11/2002 | Home et al. | |
| 6,535,971 B1 * | 3/2003 | Shirasawa et al. | 712/34 |
| 6,546,017 B1 * | 4/2003 | Khaunte | 370/412 |

(Continued)

FOREIGN PATENT DOCUMENTS

| | | |
|---|---|---|
| CA | 2145801 A1 | 12/1995 |
| CN | 1323502 A | 11/2001 |

(Continued)

OTHER PUBLICATIONS

International Search Report and Written Opinion—PCT/US2008/076719, International Searching Authority—European Patent Office, Mar. 17, 2009.

(Continued)

*Primary Examiner* — Hassan Phillips
*Assistant Examiner* — Prenell Jones
(74) *Attorney, Agent, or Firm* — Howard Seo (57) ABSTRACT

Techniques for performing priority scheduling and admission control in a communication network are described. In an aspect, data flows may be prioritized, and packets for data flows with progressively higher priority levels may be placed at points progressively closer to the head of a queue and may then experience progressively shorter queuing delays. In another aspect, a packet for a terminal may be transferred from a source cell to a target cell due to handoff and may be credited for the amount of time the packet has already waited in a queue at the source cell. In yet another aspect, all priority and non-priority data flows may be admitted if cell loading is light, only priority data flows may be admitted if the cell loading is heavy, and all priority data flows and certain non-priority data flows may be admitted if the cell loading is moderate.

39 Claims, 7 Drawing Sheets

U.S. PATENT DOCUMENTS

| | | | |
|---|---|---|---|
| 6,754,311 B1 | 6/2004 | Kampmeier et al. | |
| 6,834,053 B1* | 12/2004 | Stacey et al. | 370/395.4 |
| 6,865,169 B1 | 3/2005 | Quayle et al. | |
| 6,925,094 B2* | 8/2005 | Sharony et al. | 370/468 |
| 6,934,250 B1* | 8/2005 | Kejriwal et al. | 370/229 |
| 7,146,002 B1 | 12/2006 | Smith et al. | |
| 7,433,304 B1* | 10/2008 | Galloway et al. | 370/229 |
| 7,545,748 B1* | 6/2009 | Riddle | 370/235 |
| 7,619,969 B2* | 11/2009 | Lin | 370/229 |
| 7,620,054 B2 | 11/2009 | Katayama | |
| 7,920,541 B2 | 4/2011 | To et al. | |
| 2001/0030974 A1* | 10/2001 | Pauwels | 370/444 |
| 2002/0031086 A1 | 3/2002 | Welin | |
| 2002/0141427 A1* | 10/2002 | McAlpine | 370/413 |
| 2003/0120795 A1* | 6/2003 | Reinshmidt | 709/232 |
| 2003/0198204 A1 | 10/2003 | Taneja et al. | |
| 2004/0111506 A1* | 6/2004 | Kundu et al. | 709/223 |
| 2005/0094628 A1* | 5/2005 | Ngamwongwattana et al. | 370/352 |
| 2005/0105488 A1 | 5/2005 | Raji et al. | |
| 2005/0111361 A1* | 5/2005 | Hosein | 370/230 |
| 2005/0135243 A1 | 6/2005 | Lee et al. | |
| 2005/0281278 A1* | 12/2005 | Black et al. | 370/412 |
| 2006/0029089 A1* | 2/2006 | Zellner et al. | 370/412 |
| 2006/0268906 A1* | 11/2006 | Kneckt | 370/401 |
| 2007/0047570 A1 | 3/2007 | Benveniste | |
| 2007/0067296 A1 | 3/2007 | Malloy et al. | |
| 2007/0104132 A1* | 5/2007 | Rajagopalan et al. | 370/329 |
| 2007/0201501 A1 | 8/2007 | Suzuki et al. | |
| 2007/0263640 A1* | 11/2007 | Finn | 370/401 |
| 2007/0280111 A1* | 12/2007 | Lund | 370/235 |
| 2008/0034086 A1* | 2/2008 | Castelli et al. | 709/224 |
| 2008/0089364 A1* | 4/2008 | Barry et al. | 370/517 |
| 2008/0212514 A1* | 9/2008 | Chen | 370/315 |
| 2009/0075665 A1 | 3/2009 | Gogic | |
| 2009/0116391 A1* | 5/2009 | Bakker et al. | 370/235 |
| 2009/0161540 A1* | 6/2009 | Zaki et al. | 370/230 |
| 2009/0182874 A1* | 7/2009 | Morford et al. | 709/224 |
| 2010/0014423 A1* | 1/2010 | Furuskar et al. | 370/235 |
| 2010/0177633 A1* | 7/2010 | Bader et al. | 370/230 |
| 2011/0103407 A1* | 5/2011 | Varier et al. | 370/503 |

FOREIGN PATENT DOCUMENTS

| | | |
|---|---|---|
| CN | 1729655 A | 2/2006 |
| EP | 1113645 A2 | 7/2001 |
| EP | 1331767 A1 | 7/2003 |
| JP | 02072755 | 3/1990 |
| JP | 5316562 A | 11/1993 |
| JP | 8097914 A | 4/1996 |
| JP | 8126040 A | 5/1996 |
| JP | 2000349786 A | 12/2000 |
| JP | 2001025048 A | 1/2001 |
| JP | 2002077383 A | 3/2002 |
| JP | 2002523989 A | 7/2002 |
| JP | 2003052074 | 2/2003 |
| JP | 2005333417 A | 12/2005 |
| JP | 2007096819 A | 4/2007 |
| JP | 2007184946 A | 7/2007 |
| JP | 2009521831 A | 6/2009 |
| RU | 2160965 C2 | 12/2000 |
| RU | 2270526 | 2/2006 |
| WO | WO9633584 A1 | 10/1996 |
| WO | WO9700583 A2 | 1/1997 |
| WO | WO0011879 | 3/2000 |
| WO | WO2004066570 A1 | 8/2004 |

OTHER PUBLICATIONS

Kaas R., et al.,"Design and Implementation of an Efficient Priority Queue", pp. 99-127, , year 1977.

Randolph Nelson et al.,"Performance Analysis of Parallel Processing Systems", IEEE Transactions on Software Engineering, vol. 14, No. 4, pp. 532-540, Apr. 1988.

Chao, H. J., "A Novel Architecture for Queue Management in the ATM Network," IEEE Journal on Selected Areas in Communications, vol. 9. No. 7, pp. 1110-1118, Sep. 1991.

Dan-geun Seong, "Electronic Switching System (Telephone Network and VoIP Network)", KAIST, 2001 Fall. pp. 1-34.

European Search Report—EP12150823—Search Authority—The Hague—Jan. 26, 2012.

Pang, J. W. M. et al., "Throughout Analysis of a Timer Controlled Token Passing Protocol under Heavy Load," IEEE Transactions on Communications, vol. 37, No. 7, pp. 694-702, Jul. 1989.

Taiwan Search Report—TW097135647—TIPO—Jun. 14, 2012.

* cited by examiner

PRIORITY SCHEDULING AND ADMISSION CONTROL IN A COMMUNICATION NETWORK

The present application claims priority to provisional U.S. Application Ser. No. 60/973,137, entitled "Resource Reservation and Queue Management in IP based Wireless Networks," filed Sep. 17, 2007, assigned to the assignee hereof and incorporated herein by reference.

BACKGROUND

I. Field

The present disclosure relates generally to communication, and more specifically to techniques for scheduling data transmission and controlling admission in a communication network.

II. Background

A communication network may observe wide fluctuations in loading due to various reasons. When the network loading is high, it may be desirable for the communication network to serve certain users ahead of other users. For example, when a natural or man-made disaster occurs, the communication network in the affected area may be strained by excessive traffic load and sometimes by impairments to the network infrastructure caused by the disaster itself. It may be desirable for the communication network to serve emergency assistance personnel, such as police and fire fighters, ahead of the general public. There is therefore a need in the art for techniques to effectively serve different users under heavy network loading.

SUMMARY

Techniques for performing priority scheduling and admission control in a communication network are described herein. In an aspect, data flows may be prioritized, and packets for different data flows may be placed at different points in a queue depending on the priorities of the data flows. In general, any number of priority levels may be supported. In one design, packets with progressively higher priority levels may be placed at points progressively closer to the head of the queue and may then experience progressively shorter queuing delays. Each data flow may be assigned a priority level, and packets for the data flow may be placed at a point in the queue determined based on the priority level of that data flow. A user may be assigned a particular priority level, and all data flows belonging to that user (originating or terminating at the user's device) may adhere to the priority level of the user.

In another aspect, a packet for a terminal may be transferred from a source cell to a target cell due to handoff and may be credited for the amount of time the packet has already waited in a queue at the source cell. The packet may be placed at a forward point in a queue at the target cell. This point may be determined based on the amount of time the packet has already waited. By not placing the packet at the end of the queue at the target cell, excessive queuing delay may be avoided for the packet.

In yet another aspect, admission control may be performed in a manner to reduce adverse effects on priority data flows. In one design, the loading of a cell may be determined based on at least one criterion, e.g., average queuing delay of packets to send. The cell loading may be deemed as light if the average queuing delay is less than a first threshold, heavy if the average queuing delay is greater than a second threshold, or moderate if the average queuing delay is between the first and second thresholds. All priority data flows and non-priority data flows may be admitted if the cell loading is light. Only priority data flows may be admitted if the cell loading is heavy. All priority data flows and certain non-priority data flows may be admitted if the cell loading is moderate. Some radio resources of the cell may be reserved in case terminals with priority data flows in neighbor cells are handed off to the cell.

Various aspects and features of the disclosure are described in further detail below.

DETAILED DESCRIPTION

The techniques described herein may be used for various wireless and wireline communication networks. The terms "network" and "system" are often used interchangeably. For example, the techniques may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network may implement a radio technology such as cdma2000, Universal Terrestrial Radio Access (UTRA), etc. cdma2000 covers IS-2000, IS-95 and IS-856 standards. UTRA includes Wideband CDMA (WCDMA) and other variants of CDMA. A TDMA network may implement a radio technology such as Global System for Mobile Communications (GSM). An OFDMA network may implement a radio technology such as Ultra Mobile Broadband (UMB), Evolved UTRA (E-UTRA), IEEE 802.16 (WiMAX), IEEE 802.20, Flash-OFDM®, etc. UTRA and E-UTRA are part of Universal Mobile Telecommunication System (UMTS). Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for a wireless communication network.

Figure 1:
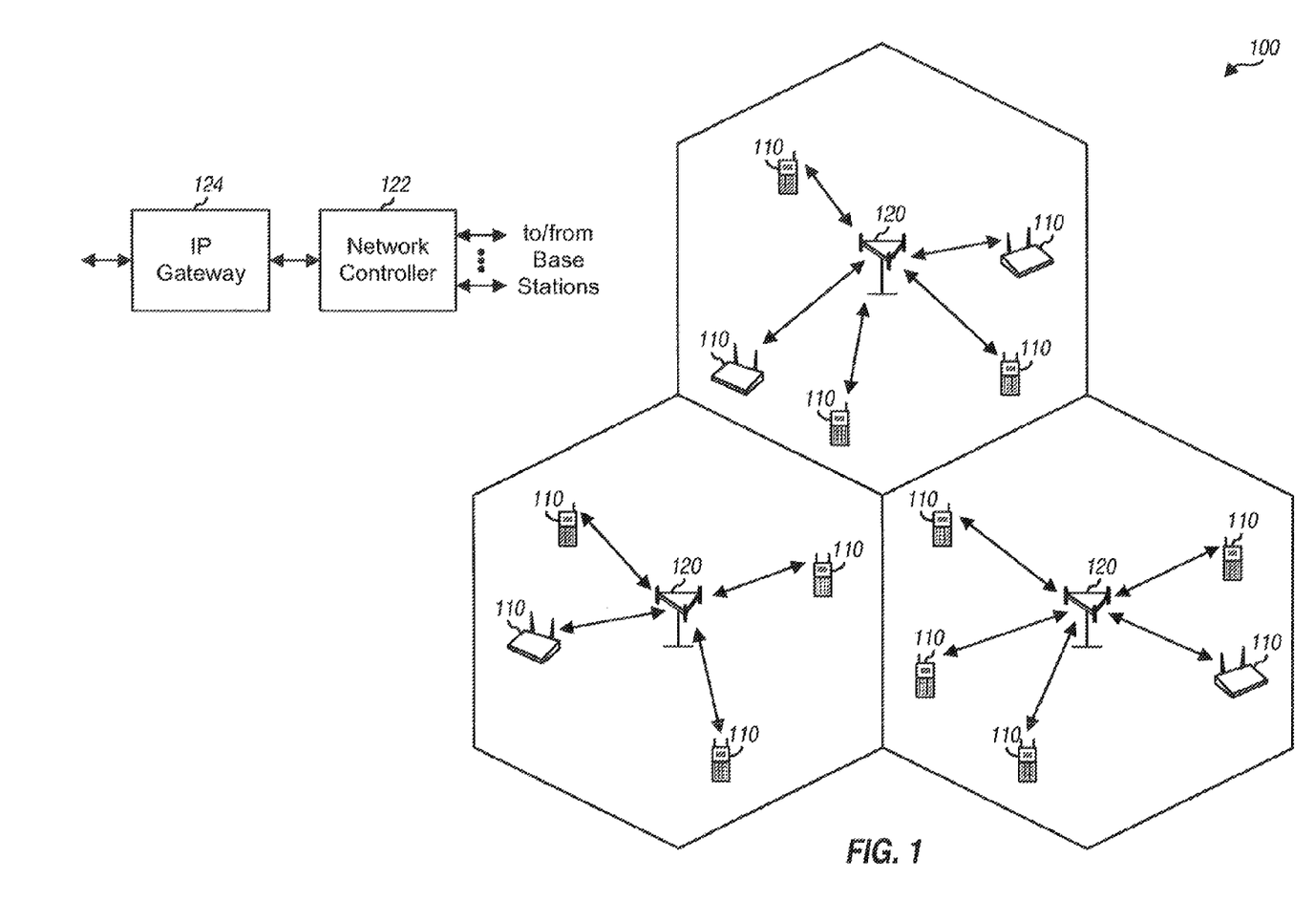
FIG. 1 shows a wireless communication network.

FIG. 1 shows a wireless communication network 100, which may include any number of base stations 120. A base station is generally a fixed station that communicates with terminals and may also be referred to as a Node B, an evolved Node B, an access point, a base transceiver station (BTS), etc. Each base station provides communication coverage for a particular geographic area. The coverage area of a base station may be partitioned into multiple (e.g., three) smaller areas. Each smaller area may be served by a respective base station subsystem. In 3GPP, the term "cell" can refer to the smallest coverage area of a base station and/or a base station subsystem serving this area, depending on the context in which the term is used. In 3GPP2, the term "sector" can refer to the smallest coverage area of a base station and/or a base station subsystem serving this area. For clarity, the concept of cell in 3GPP is used in the description below.

A network controller 122 may couple to a set of base stations and provide coordination and control for these base stations. An Internet Protocol (IP) gateway 124 may support data services for terminals and may be responsible for establishment, maintenance, and termination of data sessions for the terminals. IP gateway 124 may couple to other data network(s) such as a core network, private and/or public data networks, the Internet, etc. Network 100 may include other network entities not shown in FIG. 1.

Terminals 110 may be dispersed throughout the network, and each terminal may be stationary or mobile. A terminal may also be referred to as a mobile station, a user equipment, an access terminal, a subscriber unit, a station, etc. A terminal may be a cellular phone, a personal digital assistant (PDA), a wireless communication device, a wireless modem, a handheld device, a laptop computer, etc. A terminal may communicate with a base station via the forward and reverse links. The forward link (or downlink) refers to the communication link from the base station to the terminal, and the reverse link (or uplink) refers to the communication link from the terminal to the base station. In the description herein, the terms "terminal" and "user" are used interchangeably. The terms "base station" and "cell" are also used interchangeably.

Network 100 may utilize a queuing mechanism to prioritize data traffic and support different quality of service (QoS) levels. A number of traffic classes (TC) may be defined for different categories of services. The traffic classes may also be referred to as QoS classes, flow classes, traffic categories, service categories, etc. Each traffic class may be associated with certain QoS guarantees such as a particular maximum delay for sending data. This maximum delay may also be referred to as delay requirement, delay tolerance, delay bound, delay limit, maximum allowable delay, etc. The term "delay requirement" is used in much of the description below. In general, any number of traffic classes may be defined. A queue may be used to store the data for each traffic class.

One or more data flows may exist on a communication link between a terminal and a cell. A data flow is a stream of data between two specific end points. A data flow may also be referred to as an IP flow, a Radio Link Control (RLC) flow, a Radio Link Protocol (RLP) flow, etc. A data flow may be active from the beginning to the end of a session. For example, a music streaming data flow may be active from the time a user accesses a web-cast server until the user turns off the media player on his/her computer. A data flow may be assigned QoS attributes at the time of service invocation or session initiation. These QoS attributes may include service descriptors such as delay requirement, allowable packet error rate, required or expected data rate, etc. A data flow may be for a particular service, and the QoS attributes may be determined based on the data requirements of the service. A data flow may be mapped to a specific traffic class based on the QoS attributes of that data flow and the QoS guarantees of different traffic classes. Packets for the data flow may be stored in the queue for the traffic class to which the data flow belongs.

Figure 2:
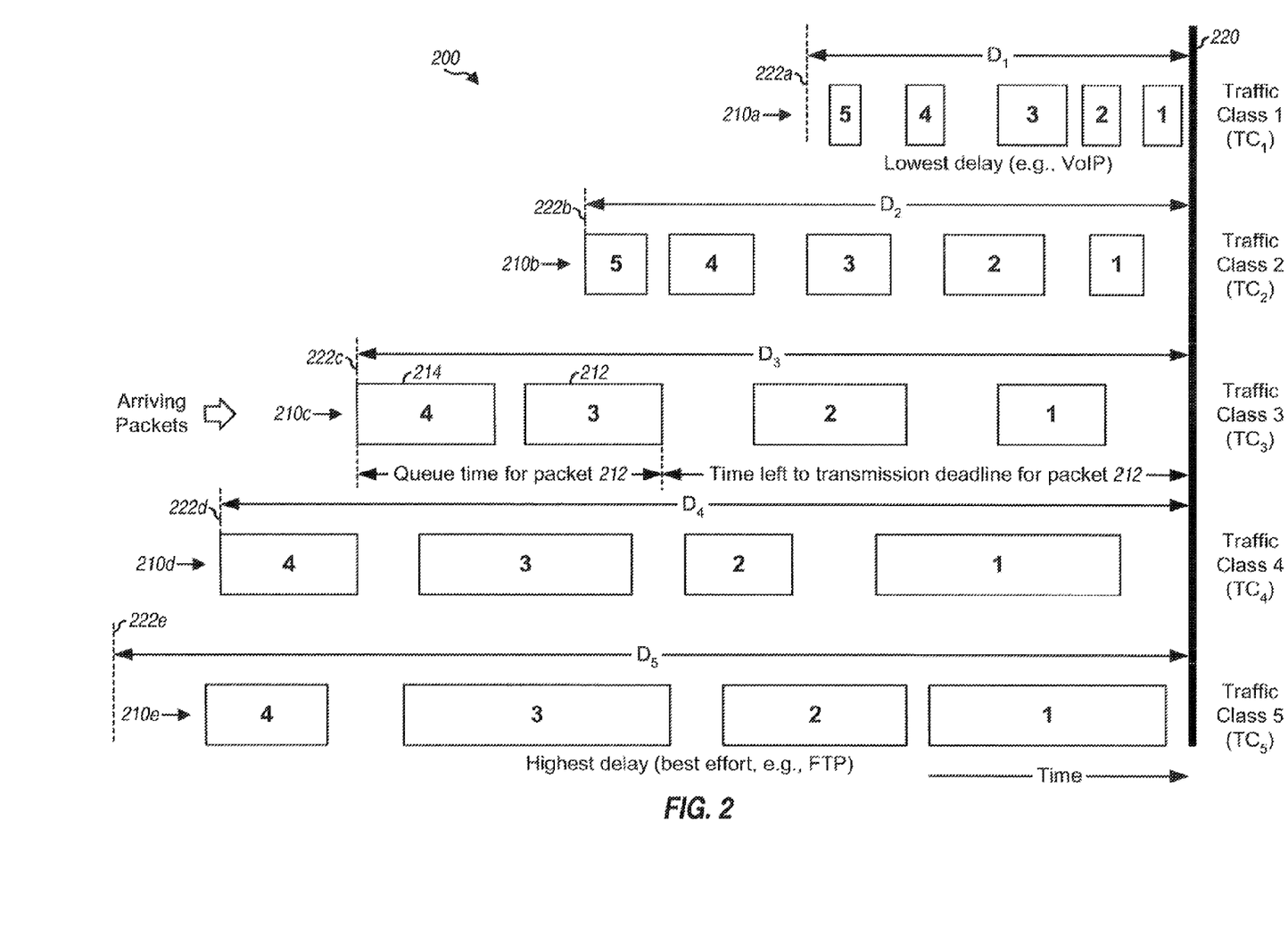
FIG. 2 shows an exemplary queuing mechanism for five traffic classes.

FIG. 2 shows an exemplary queuing mechanism 200 for five traffic classes 1 through 5, which are labeled as $TC_1$ through $TC_5$, respectively. In the example shown in FIG. 2, the five traffic classes have progressively longer delay requirements. Traffic class 1 has the shortest delay requirement of $D_1$ and may be used for Voice-over-IP (VoIP), teleconferencing, and other real-time services. Traffic classes 2, 3 and 4 have progressively longer delay requirements of $D_2$, $D_3$ and $D_4$, respectively. Traffic class 5 has the longest delay requirement of $D_5$ and may be used for best effort flows such as File Transfer Protocol (FTP). The delay requirements of the five traffic classes may have any suitable values and are not drawn to scale in FIG. 2. For example, the $D_1$ delay requirement of traffic class 1 may be 50 milliseconds (ms) or less, the $D_2$ delay requirement of traffic class 2 may be several hundred milliseconds, etc.

FIG. 2 shows an example of five queues for the five traffic classes at an entity, which may be a cell or an IP gateway. A cell may maintain the queues to store data to send on the forward link to different terminals. Separately, a cell may maintain the queues to store data received from various terminals on the reverse link and may send the stored data toward an IP gateway. For clarity, much of the following description is for transmission on the forward link, and any deviations for the reverse link are discussed separately.

A cell may receive packets (e.g., from IP gateway 124 in FIG. 1) for transmission to different terminals. The packets may also be referred to as IP packets, datagrams, frames, etc. Each packet may be destined for a specific recipient terminal, and the packets for each terminal are depicted as boxes with different fills in FIG. 2. The packets may have different sizes, as illustrated by different sizes for the boxes. The amount of time to transmit each packet may be dependent on the data rate of transmission, which may be dependent on the amount of radio resources assigned to the recipient terminal, the channel conditions observed by the terminal, etc.

FIG. 2 shows a snapshot of the five queues at a specific time instant. In FIG. 2, the horizontal axis represents time, and incoming packets arrive from the left side of FIG. 2. The five queues for the five traffic classes are represented by five horizontal rows of boxes 210a through 210e for packets stored in these five queues. The head of each queue is the rightmost box for that queue, and the back of each queue is the leftmost box for that queue.

Each packet may belong to a particular data flow and, when received, may be placed at the end of the queue for the traffic class to which the data flow belongs. Each queue may store packets for different terminals in the order in which the packets are received. Each packet may move from the back of the queue toward the head of the queue as packets in the queue are transmitted.

In FIG. 2, a heavy vertical line 220 may represent the transmission deadline for each packet in the five queues. Dashed vertical lines 222a through 222e may represent the points where arriving packets are placed in the five queues and may be drawn at distances of $D_1$ through $D_5$, respectively, from heavy vertical line 220. The distance from each dashed vertical line 222 to heavy vertical line 220 is determined by the delay requirement of the associated traffic class. Traffic class 5 may not have any delay requirement, in which case dashed vertical line 222e may not be present.

When a packet is received at the cell, it may be classified and placed in the proper queue at the dashed vertical line 222 for that queue. With passage of time, the packets move from the left to the right in FIG. 2 and approach their transmission deadline at heavy vertical line 220. The distance from the leading/right edge of each box to heavy vertical line 220 is the amount of time left to the transmission deadline. The distance from the leading edge of each box to dashed vertical line 222 is the amount of time spent in the queue. As an example, when a packet 212 arrived at the cell, it is classified and placed in the queue for traffic class 3 at dashed vertical line 222c (not shown in FIG. 2). As time passes while waiting to be transmitted, packet 212 moves toward its transmission deadline at heavy vertical line 220. A short time later, another packet 214 for another terminal arrives at the cell, is classified in the same queue for traffic class 3, and is likewise placed at dashed vertical line 222c after packet 212.

The packets for each traffic class may be transmitted in a first-in-first-out (FIFO) manner. In FIG. 2, the packets in the queue for each traffic class are sequentially numbered starting with 1 for the packet at the head of the queue. For each queue, the number in each box indicates the order in which the packet arrived. The packets in each queue may be transmitted in the order in which they are received, starting with packet 1, followed by packet 2, etc. Each packet may be transmitted at or before it reaches heavy vertical line 220 in order to meet the transmission deadline for that packet.

The packets in the five queues may be transmitted such that the delay requirements of these packets can be met. One possible order of transmission may be as follows: $TC_1(1)$, $TC_5(1)$, $TC_2(1)$, $TC_1(2)$, $TC_4(1)$, $TC_3(1)$, $TC_1(3)$, $TC_2(2)$, $TC_1(4)$, $TC_3(2)$, $TC_5(2)$, $TC_2(3)$, $TC_1(5)$, etc., where $TC_k(m)$ denotes packet m for traffic class k. The packets may also be transmitted in other orders.

If the network is lightly loaded, then the packets may be transmitted soon after they arrive at the cell. For example, packet 212 may be transmitted by the time packet 214 arrives. Thus, the number of packets waiting in the queues may be low, and much of the space between the least recently arrived (or oldest) packets and the transmission deadline at heavy vertical line 220 may be empty.

As the network becomes congested, the delays of the packets increase, and the space between heavy vertical line 220 and dashed vertical lines 222a through 222e may be filled up. A scheduler may attempt to maintain the delays of the packets within their delay requirements and may attempt to schedule each packet for transmission before that packet goes past its transmission deadline at heavy vertical line 220. The scheduler may select packets for transmission such that the packets in the five traffic classes approach their delay requirements approximately simultaneously.

As an example, the scheduler may perform load balancing between two traffic classes X and Y, with traffic class Y having longer (more relaxed) delay requirement than traffic class X. At a given instance of time, the delay of a packet in traffic class X may be denoted as D(X), and the delay of a packet in traffic class Y may be denoted as D(Y). The short-term behavior of the scheduler may follow one of the two cases below.

Case 1. In a preceding segment of time, there may be more arriving packets for traffic class X than traffic class Y. D(X) may approach the delay requirement of traffic class X before D(Y) approaches the delay requirement of traffic class Y. In an upcoming segment of time, the scheduler may allocate more radio resources for the packets in traffic class X, and less or no radio resources for the packets in traffic class Y. D(X) may be reduced and D(Y) may start to increase, which may then rebalance D(X) and D(Y) and prevent D(X) from moving toward its limit.

Case 2. The converse case may also apply. In the preceding segment of time, there may be more arriving packets for traffic class Y than traffic class X. In the upcoming segment of time, the scheduler may allocate more radio resources to traffic class Y, and less or no radio resources to traffic class X. D(Y) may be reduced and D(X) may start to increase, which may then rebalance D(X) and D(Y).

The load balancing described above may be extended to any number of traffic classes. In a highly congested network, the scheduler may allocate more radio resources to traffic classes with more packets, and all traffic classes may approach their respective delay requirements simultaneously. When the queues are full, the scheduler may take maximum advantage of traffic elasticity, which is the tolerance of delays, by waiting for the last possible moment to transmit packets belonging to more delay tolerant flows.

The scheduler may keep the delays of packets in each traffic class within the delay requirement of that traffic class and may simultaneously approach the delay requirements of all traffic classes. However, the scheduler may have a bias toward the highest traffic class with the shortest delay requirement, e.g., traffic class 1 in FIG. 2. Thus, when the network is heavily loaded, the lowest traffic class with the longest delay requirement may first experience intolerable delays. This lowest traffic class may be for best-effort services and may encompass FTP traffic (such as e-mail) and other traffic that can tolerate longer delays. Exceeding the delay requirement of such traffic may have negligible impact. Hence, data in the lowest traffic class may be maintained in the queue as long as buffer overflow and higher layer protocol timeouts do not occur. Buffer overflow or protocol timeout may or may not result in termination of a data flow. For example, FTP timeout may result in packet re-transmission, thus maintaining the data flow.

For interactive services such as web browsing, packets may be kept in the queues despite exceeding their delay requirements. The users may start abandoning the services when they experience excessive delays. This may reduce traffic demands as well as network loading.

The description above assumes that the scheduler can freely determine which packets to transmit. This assumption may not hold completely for some radio technologies. Furthermore, for some real-time services such as VoIP, the network may reserve some radio resources for a given data flow so that the packets in this data flow may be considered as having been pre-scheduled. The description above may then apply to traffic classes and radio resources not affected by these deviations.

In an aspect, data flows may be prioritized, and packets for the data flows may be placed at different points in a queue depending on the priorities of different data flows. In one design, a given data flow may be mapped to a traffic class as described above and may also be assigned a priority level. In general, any number of priority levels (N) may be supported for each traffic class. Priority level 1 may be the highest, and priority level N may be the lowest. Different traffic classes may have the same or different numbers of priority levels. The packets for all data flows in each traffic class may have the delay requirement of that traffic class. However, the packets for data flows with higher priority levels may be sent with shorter delays on average.

Figure 3:
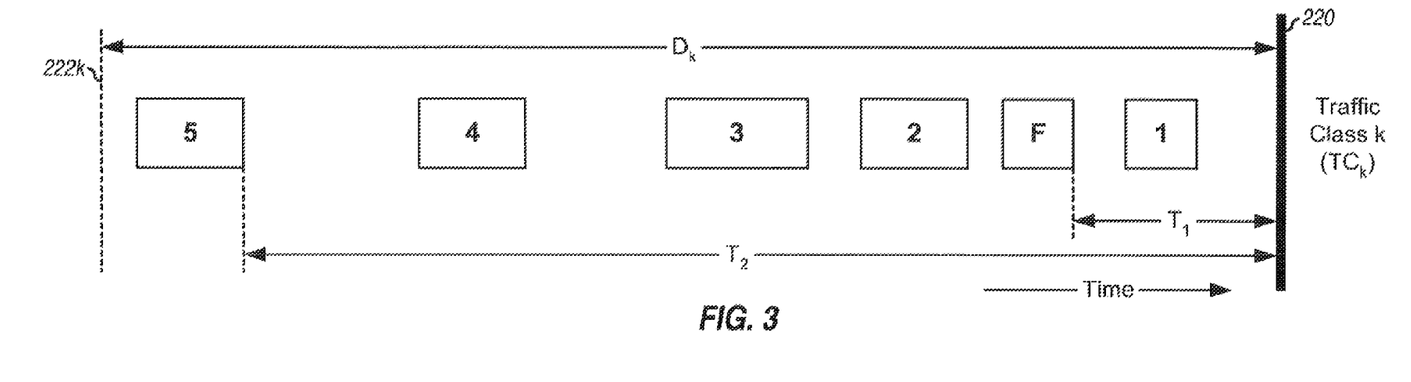
FIG. 3 shows a design of priority scheduling with two priority levels.

FIG. 3 shows a design of priority scheduling for one traffic class k ($TC_k$) with two priority levels 1 and 2. In this design, a data flow with priority level of 1 may be referred to as a priority data flow, and a data flow with priority level of 2 may be referred to as a non-priority data flow. Traffic class k may have a delay requirement of $D_k$, which may be applicable for all data flows in traffic class k. Packets for non-priority data flows may be referred to as non-priority packets and may have a target queuing time of $T_2$, where in general $T_2 \leq D_k$. Packets for priority data flows may be referred to as priority packets and may have a target queuing time of $T_1$, where in general $0 \leq T_1 < T_2$. The target queuing time may also be referred to as the estimated queuing time, the expected transmission delay, etc. The target queuing time $T_2$ may be dependent on network loading and other factors. The target queuing time $T_1$ may be selected based on various factors such as the total number of priority levels supported by the system, the current expected queuing delay or the delay requirement of traffic class k, the current expected delay for this priority level, etc. In one design, $T_1$ may be selected such that the expected transmission delay for priority packets is no more than P percentage of the delay requirement of traffic class k, where P may be any suitable values.

When a non-priority packet for traffic class k is received, the packet may be placed at the end of the queue for traffic class k. When a priority packet (denoted as F in FIG. 3) for traffic class k is received, the packet may be placed in the same queue. However, instead of placing packet F at the end of the queue, packet F may be placed at a point within the queue such that its estimated queuing time is $T_1$. The actual queuing time of a packet may not be known with certainty because of various factors related to the dynamics of the network and the sharing of radio resources. The queuing time may be estimated based on available information such as the most recent network loading, etc. Packet F may be placed forward in the queue such that the estimated queuing time of packet F is $T_1$.

In general, a priority packet may be placed at any point in a queue before the end of the queue. The priority packet may be placed at the start of the queue (not shown in FIG. 3) or a point between the start and the end of the queue (as shown in FIG. 3).

Figure 4:
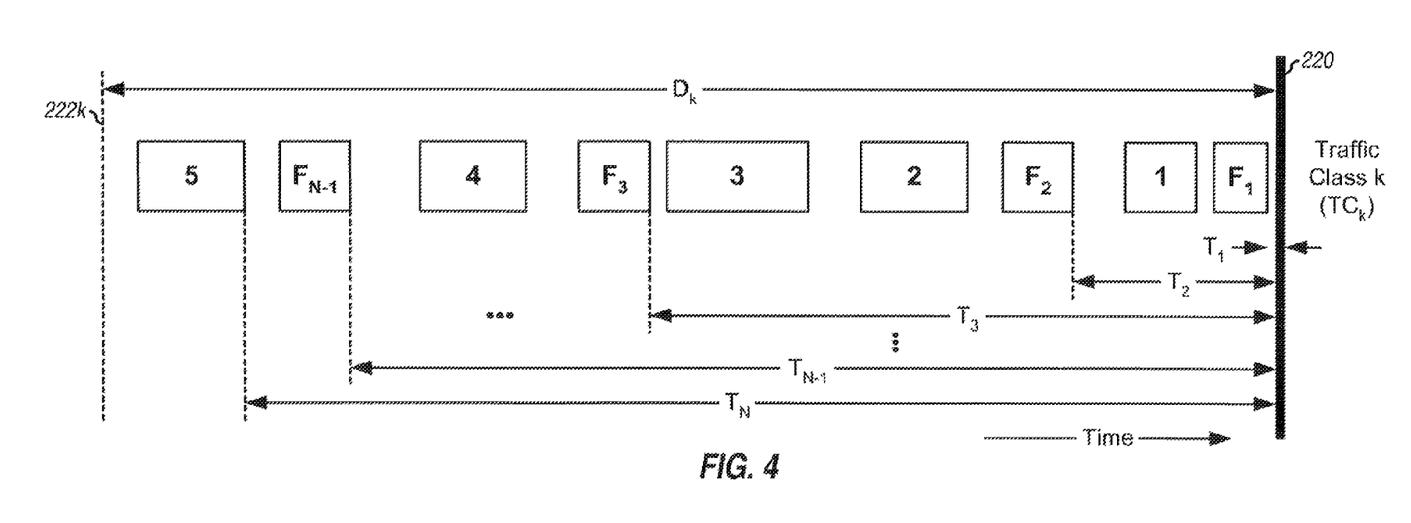
FIG. 4 shows a design of priority scheduling with N priority levels.

FIG. 4 shows a design of priority scheduling for one traffic class k ($TC_k$) with N priority levels 1 through N, where in general $N \geq 1$. In this design, traffic class k may have a delay requirement of $D_k$, which may be applicable for all data flows in traffic class k. Packets for data flows with the highest priority level 1 may have a target queuing time of $T_1$, packets for data flows with the second highest priority level 2 may have a target queuing time of $T_2$, and so on, and packets for data flows with the lowest priority level N may have a target queuing time of $T_N$, where in general $0 \leq T_1 < T_2 < \ldots < T_N \leq D_k$. Arriving packets with the lowest priority level N may be placed at the end of the queue. Arriving packets with higher priority levels 1 through N−1 may be placed at different points in the queue, commensurate with their priority levels, such that these packets can achieve the target queuing times of $T_1$ through $T_{N-1}$, respectively.

The target queuing times for the higher priority levels may be selected in various manners. In one design, which may be referred to as priority scheduling design A, the target queuing time $T_n$ for priority level n may be selected such that the expected transmission delay for packets with priority level n is no more than $P_n$ percentage of the delay requirement $D_k$ for traffic class k, where $n \in \{1, \ldots, N\}$. The percentages for the N priority levels may be defined such that $0 \leq P_1 < P_2 < \ldots < P_N \leq 1$.

In another design, which may be referred to as priority scheduling design B, the target queuing time $T_n$ may be selected such that the expected transmission delay for packets with priority level n is no more than $P_n$ percentage of the current expected queuing delay $E_k$ for traffic class k. In this design, the target queuing time $T_n$ may be bounded by a particular minimum value that may be common for all priority levels or may be different for each priority level.

For clarity, a specific example for both priority scheduling designs A and B is described below. In this example, traffic class k has a delay requirement of $D_k = 1,500$ ms and a current expected queuing delay of $E_k = 1,000$ ms. Since $E_k < D_k$, congestion condition is not encountered for traffic class k. Five priority levels 1 through 5 are defined for traffic class k. For design A, the target queuing times $T_1$ through $T_5$ for the five priority levels are defined to be 0%, 15%, 30%, 50% and 75% of the delay requirement $D_k$ of traffic class k. For design B, the target queuing times $T_1$ through $T_5$ for the five priority levels are defined to be 0%, 15%, 30%, 50% and 75% of the current expected queuing delay $E_k$ for traffic class k. Table 1 shows the target queuing times $T_1$ through $T_5$ for the five priority levels for both designs A and B.

TABLE 1

| Priority Level | Target Queuing Time | Priority Scheduling Design A with $D_k = 1500$ ms | | Priority Scheduling Design B with $E_k = 1000$ ms | |
|---|---|---|---|---|---|
| 1 | $T_1$ | 0% of $D_k$ | 0 ms | 0% of $E_k$ | 0 ms |
| 2 | $T_2$ | 15% of $D_k$ | 225 ms | 15% of $E_k$ | 150 ms |
| 3 | $T_3$ | 30% of $D_k$ | 450 ms | 30% of $E_k$ | 300 ms |
| 4 | $T_4$ | 50% of $D_k$ | 750 ms | 50% of $E_k$ | 500 ms |
| 5 | $T_5$ | 75% of $D_k$ | 1000 ms | 75% of $E_k$ | 750 ms |

For design A, the target queuing time $T_n$ for each priority level n may be bounded by the smaller of $E_k$ or $D_k$, so that $T_n \leq \min\{E_k, D_k\}$. When the queue is not full, $E_k$ is less than $D_k$ and represents the end of the queue. Thus, if $T_n$ is greater than $E_k$ for any given priority level n, then packets for priority level n may be placed at $E_k$ instead of at $T_n$. In the example shown in Table 1, priority level 5 has a computed value of 1125 ms for 75% of $D_k$. Since 1125 ms is greater than 1000 ms for $E_k$, $T_5$ is set to 1000 ms instead of 1125 ms. The packets with priority level 5 may thus be placed at the end of the queue instead of at 1125 ms.

When the network is not congested and $E_k < D_k$, designs A and B may provide different target queuing times for the N priority levels, e.g., as shown in Table 1. However, when the network approaches congestion point, designs A and B may provide the same target queuing times for the N priority levels.

In another design, which is not shown in FIG. 4 and may be referred to as priority scheduling design C, the packets with higher priority levels may be placed at the same point in the queue, so that $T_1 = T_2 = \ldots = T_{N-1}$. However, the packets may be ordered in accordance with their priority levels, so that packets with priority level 1 may be placed before packets with priority level 2, which may be placed before packets with priority level 3, etc. The single point $T_n$ may be at the start of the queue or may be somewhere between the start and the end of the queue.

The target queuing times for the N priority levels may also be defined in other manners. For example, some priority levels may have the same target queuing time while other priority levels may have different target queuing times.

One priority scheduling design may be selected for use, and the same priority scheduling may be performed for each of the K traffic classes. A combination of priority scheduling designs may also be used. For example, priority scheduling design A may be used for a first group of zero or more traffic classes, priority scheduling design B may be used for a second group of zero or more traffic classes, and priority scheduling design C may be used for a third group of zero or more traffic classes.

The priority scheduling designs described above may be used for any number of priority levels (N). N may be selected based on one or more standards supported by the network and/or other factors. For example, National Communication Systems (NCS) is developing a set of requirements for all networks in the United States to comply with a 5-level priority scheme. Five or more priority levels may be defined to support NCS requirements. As another example, Multimedia Priority Service (MMPS) in 3GPP2 stipulates up to N priority levels, where N may be defined by a network operator. A configurable number of priority levels may be used to support MMPS requirements.

A data flow may be assigned QoS attributes at the time of service invocation or session initiation. The QoS attributes may be effectively "modulated" by the priority levels described above. For example, an e-mail service may have a delay requirement of 10 seconds, and e-mail packets may be stored in a queue for up to 10 seconds without causing timeout errors. However, a priority user may be assigned priority level 1, and e-mail packets for this user may be placed in the queue such that they experience queuing delays of two seconds or less. The e-mail service does not change for this priority user, e.g., timeout errors would not occur unless the queuing delay is 10 seconds or more. Thus, under normal operating scenario, the e-mail service for the priority user would not timeout regardless of whether or not the network is congested. The timeout error condition is unchanged for the priority user and may occur under some extraordinary circumstance, e.g., failure of a base station. In any case, the priority scheduling described above may allow priority data flows to observe shorter queuing delays and other preferential treatment while still retaining the QoS attributes of the associated traffic classes. Effectively, the QoS attributes of these data flows under network congestion conditions would be as if the traffic load is low.

Figure 5:
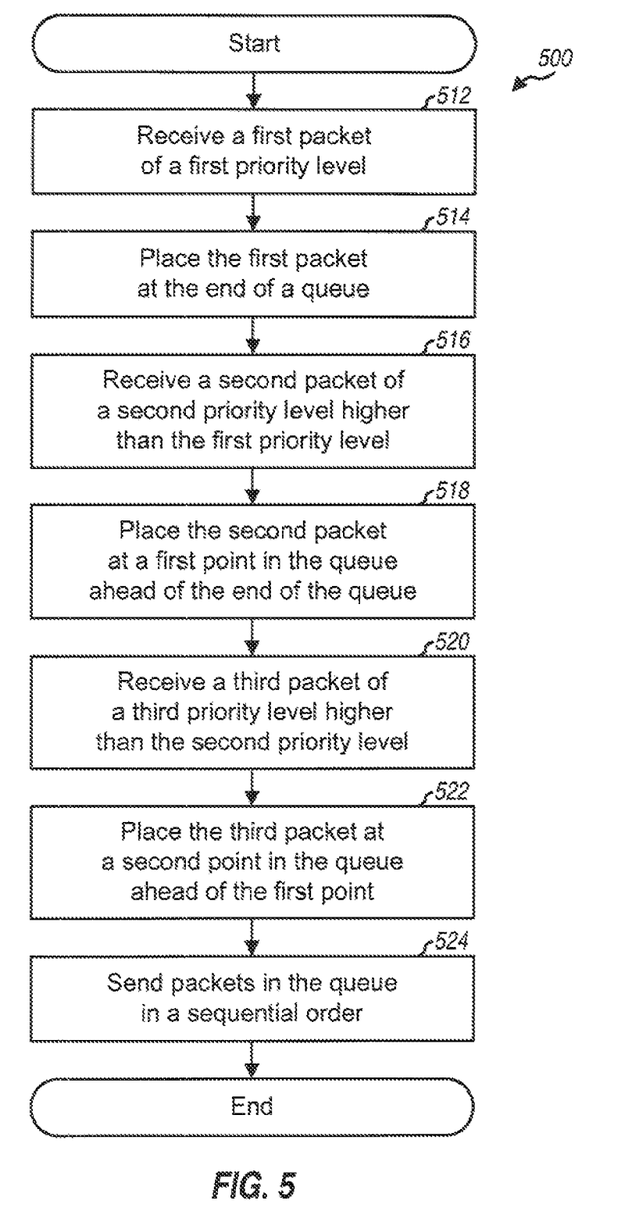
FIG. 5 shows a process for sending data with priority scheduling.

FIG. 5 shows a design of a process 500 for sending data with priority scheduling. Process 500 may be performed by a cell for data transmission on the forward link, by a terminal for data transmission on the reverse link, or by some other network entity. A first packet of a first priority level may be received (block 512) and may be placed at the end of a queue (block 514). A second packet of a second priority level higher than the first priority level may be received (block 516). The second packet may be placed at a first point in the queue ahead of the end of the queue (block 518). In one design of block 518, a target queuing time for the second priority level may be determined, e.g., based on a predetermined percentage of a delay requirement of the second packet or a predetermined percentage of an expected queuing delay for the packets in the queue. The first point in the queue may then be determined based on the target queuing time. The first and second packets may belong to different data flows in the same traffic class and may have QoS attributes associated with the traffic class. The first and second packets may also be destined for two terminals.

A third packet of a third priority level higher than the second priority level may be received (block 520). The third packet may be placed at a second point in the queue ahead of the first point (block 522). In another design of block 522, the third packet may be placed at the first point in the queue. However, packets of the third priority level may be placed ahead of packets of the second priority level at the first point when these packets are received at the same time.

In one design, a packet of one of multiple priority levels may be received. The multiple priority levels may be associated with different points in the queue. A point in the queue for the packet may be determined based on the priority level of the packet. The packet may then be placed at the determined point in the queue. In any case, the packets in the queue may be sent in a sequential order (block 524).

In one design, multiple queues may be maintained for multiple traffic classes, one queue for each traffic class. Multiple priority levels may be supported for each traffic class and may be associated with different points in the queue for that traffic class. Each packet may be placed in the queue for the traffic class of that packet and at the point in the queue determined by the priority level of the packet.

In another aspect, a packet for a terminal may be transferred from a source cell to a target cell due to handoff of the terminal and may be credited for the amount of time the packet has already waited in a queue at the source cell. The packet may be placed at a forward point in a queue at the target cell. This point may be determined based on the amount of time the packet has already waited. By not placing the packet at the end of the queue at the target cell, excessive queuing delay may be avoided for the packet.

Figure 6:
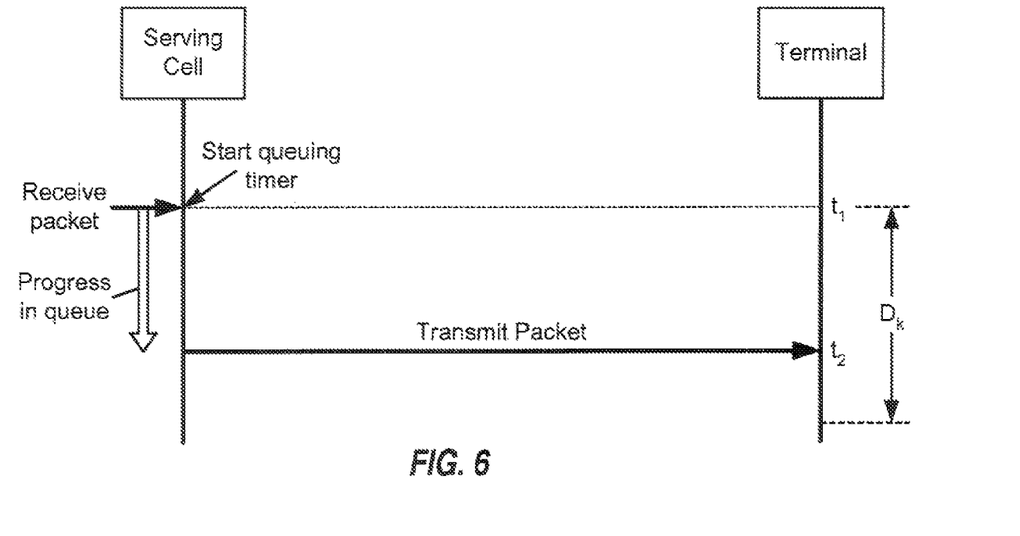
FIG. 6 shows routing and transmission of a packet to a terminal without handoff.

FIG. 6 shows routing and transmission of a packet to a terminal without handoff. At time $t_1$, the network may receive the packet destined for the terminal and may route the packet to a serving cell for the terminal. The serving cell may be the cell with the highest signal-to-noise ratio (SNR) at the terminal. The serving cell may time stamp the packet upon receipt in order to track the queuing delay of the packet. The serving cell may determine the traffic class of the packet and may place the packet in an appropriate queue, e.g., either at the end of the queue or at a forward point if the packet has higher priority. The packet may progress in the queue along the time axis (which is vertically downward in FIG. 4) and towards the delay requirement of $D_k$ for the traffic class. At time $t_2$, the packet reaches the head of the queue. If the terminal is still within the coverage of the serving cell, then the serving cell may transmit the packet to the terminal at the originally scheduled time.

Figure 7:
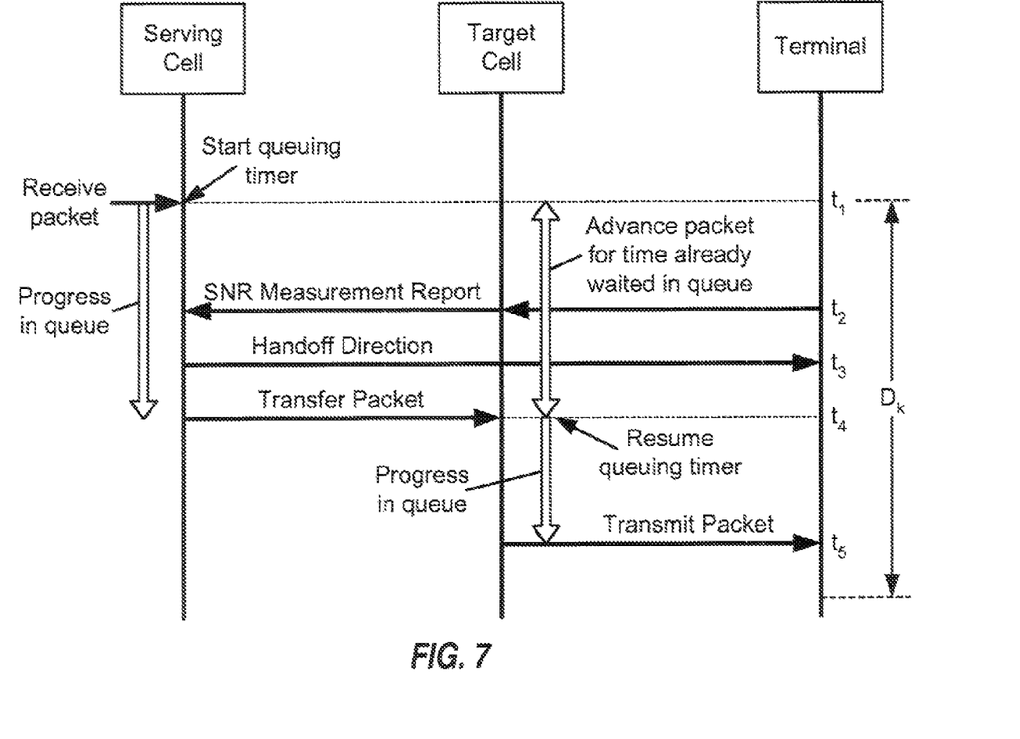
FIG. 7 shows routing and transmission of a packet to a terminal with handoff.

FIG. 7 shows routing and transmission of a packet to a terminal with handoff. At time $t_1$, the network may receive the packet destined for the terminal and may route the packet to a serving cell for the terminal. The serving cell may time stamp the packet upon receipt and may place the packet at a proper point in an appropriate queue. The packet may progress in the queue along the time axis. The terminal may be mobile and may estimate the SNRs of nearby cells. The terminal may determine that the SNR of another cell is better than the SNR of the serving cell. At time $t_2$, the terminal may send an SNR measurement report to the serving cell and/or the better cell, which is a target cell for handoff. At time $t_3$, for network-initiated handoff, the serving cell may send a handoff direction message to the terminal to initiate handoff to the target cell.

At time $t_4$, the serving cell may transfer the packet to the target cell. The target cell may determine the traffic class of the packet and may place the packet in an appropriate queue. The target cell may place the packet at a point in the queue such that the packet is time advanced by an amount of time that the packet has already waited in the queue at the serving cell. The packet may thus be credited for prior waiting time so that it can be transmitted in a timely manner. The packet may then progress in the queue at the target cell in the normal manner and may be transmitted by the target cell to the terminal when the packet reaches the head of the queue at time $t_5$.

FIG. 7 shows an example in which the terminal is handed off once while the packet waits to be transmitted. The packet handling in FIG. 7 may be extended to cover any number of handoffs prior to transmission of the packet. In general, a target cell may place a packet at a forward point in an appropriate queue at the target cell such that the packet is credited for some or all of prior waiting time.

Each cell handling the packet may also place the packet at a proper point in an appropriate queue to account for the priority of the packet. The cell that receives the packet from the network may place the packet at a point determined based on any of the priority scheduling designs described above. Each subsequent cell may (i) determine the remaining target queuing time for the packet, which may be equal to the target queuing time minus the prior waiting time, and (ii) place the packet in the queue such that the packet can wait the remaining target queuing time. The handling of the packet by different target cells due to handoff should not adversely impact the priority handling of the packet. The placement of the packet in the queue of each target cell may mimic the placement of the packet in the queue of the cell that originally received the packet from the network.

A terminal may be handed off to a target cell and then back to a prior serving cell. The serving cell may store the packet for a predetermined amount of time, e.g., until the delay requirement of the packet expires. This may avoid having to forward the packet from the target cell back to the prior serving cell.

Queuing delays generally increase during periods of network congestion, and a packet may wait longer in a queue as a result of the congestion. The likelihood of channel conditions changing and the likelihood of handoff may both increase the longer the packet waits for transmission. Priority packets may generally wait in queues for less time than non-priority packets in the same traffic class. Hence, mobility may have less impact on priority packets than non-priority packets, and the impact may be progressively less for progressively higher priority levels.

Figure 8:
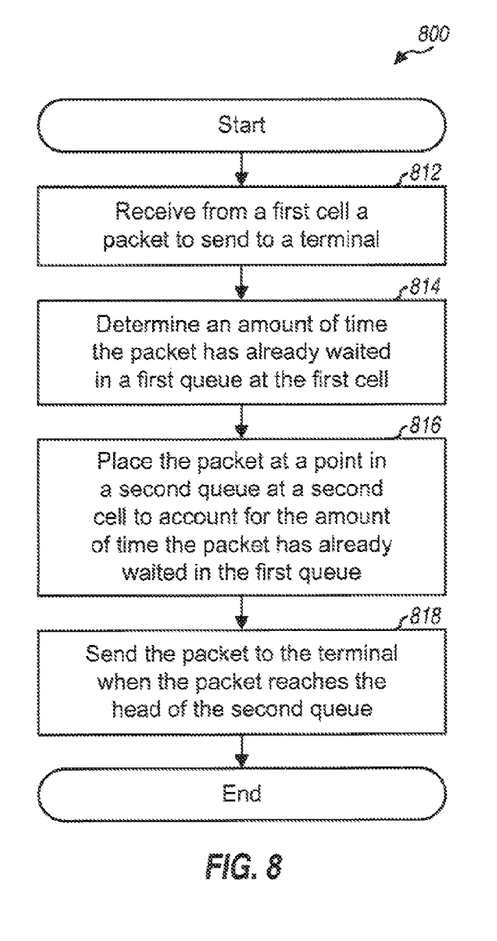
FIG. 8 shows a process for sending data to account for prior queuing time.

FIG. 8 shows a design of a process 800 for sending data to account for prior queuing time. A packet to send to a terminal may be received from a first cell (block 812). The packet may have been placed (i) at the end of a first queue at the first cell or (ii) at a point in the first queue determined based on the priority level of the packet. The packet may be retained by the first cell until the delay requirement of the packet has passed.

The amount of time the packet has already waited in the first queue at the first cell may be determined (block 814). The packet may be placed at a point in a second queue at a second cell to account for the amount of time the packet has already waited in the first queue (block 816). In one design of block 816, the remaining target queuing time for the packet may be determined based on a target queuing time for the packet and the amount of time the packet has already waited in the first queue. The packet may then be placed at the point in the second queue determined based on the remaining target queuing time for the packet. The packet may be sent to the terminal when it reaches the head of the second queue (block 818).

Admission control may be performed to limit the number of terminals to admit in the network, to limit the amount of traffic, and to avoid or mitigate network congestion. When the network is not congested, each terminal desiring access to the network may be admitted. As traffic volume increases and the network approaches the point of congestion, further increases in traffic volume may be governed by admission policy. New data flows may be curtailed and, at certain point, may be completely stopped in order to mitigate network congestion.

In yet another aspect, admission control and resource management may be performed in a manner to reduce adverse effects on priority data flows and terminals. In a first design, data flows may be classified as priority or non-priority data flows. A data flow may be deemed as a priority data flow based on various factors such as QoS attributes of the data flow, whether or not the data flow is for emergency services, whether the data flow is for a user with a premium subscription, etc. Data flows that are not priority data flows may be deemed as non-priority data flows. Priority and non-priority data flows may be admitted based on cell loading, as described below. The first design may allow for admission of data flows on a per data flow basis.

In a second design, terminals may be classified as priority or non-priority terminals and may be admitted based on cell loading. A terminal may have an active or dormant session and may have one or more data flows in one or more traffic classes for an active session. The second design may be considered as a special case of the first design in which all data flows of a terminal may be either admitted or not admitted.

In one design, admission control may be performed for each cell based on the loading of that cell. In one design, priority data flows may be admitted and non-priority data flows may be curtailed or blocked as cell loading becomes full. In one design, to support mobility of priority terminals, each cell may set aside some radio resources or may control allocation of the radio resources in case priority terminals in neighbor cells are handed off to that cell. Each cell may curtail or stop admission of non-priority terminals in that cell if there are priority terminals with active sessions (e.g., have recent or on-going activity, such as ongoing VoIP sessions) in neighbor cells.

A network entity that performs admission control (e.g., a Policy Control Function) may have access to various types of information such as:
  QoS attributes of data flows or sessions of terminals,
  Priority status of data flows or sessions, including those in neighbor cells,
  Current queuing delay statistics of each cell of interest, and
  Other relevant information.

Various admission rules may be defined based on the above information and/or other information. Different admission rules may be defined for different levels of cell loading. In general, any number of cell loading levels may be supported, and the cell loading levels may be defined in various manners, e.g., by a network operator.

In one design, three admission rules may be applied to three cell loading levels, as follows:
  Light cell loading—no admission restrictions are applied,
  Moderate cell loading—admit non-priority data flows on a scale inversely proportional to the number of priority terminals with active sessions in neighbor cells, and
  Heavy cell loading—admit only priority data flows.

In one design, admission control may be performed separately for each traffic class. In this design, the loading level may be determined for each traffic class in each cell. In one design, the loading level of each traffic class may be defined based on an average queuing delay for that traffic class. For example, light cell loading (or no congestion) may be defined by the average queuing delay being less than a first percentage (e.g., 50%) of the delay requirement of the traffic class. Moderate cell loading may be defined by the average queuing delay being between the first percentage and a second percentage (e.g., 90%) of the delay requirement. Heavy cell loading (or congestion) may be defined by the average queuing delay being more than the second percentage of the delay requirement. The cell loading levels may also be defined based on other criteria.

For moderate cell loading, the number of non-priority data flows to admit may be a function of the average queuing delay.

In one design, the average queuing delay may be converted to a reserved capacity, as follows:

$$C_k = (Z_k - Q_k) * F_k, \quad \text{Eq (1)}$$

where $Q_k$ is the average queuing delay relative to the delay requirement of traffic class k, $F_k$ is a scaling factor for traffic class k, $Z_k$ is the second percentage for traffic class k, and $C_k$ is the reserved capacity for traffic class k.

The reserved capacity may be given in number of sessions or terminals or the number of data flows. The value of the scaling factor $F_k$ and the value of the second percentage $Z_k$ may be selected based on empirical testing, computer simulation, etc. The average queuing delay may be filtered, e.g., averaged over a period of time. As an example, the average queuing delay may be 60% of the delay requirement, the scaling factor may be equal to 0.5, and the second percentage may be equal to 90%. The reserve capacity may then be computed as $C_k = (90-60)*0.5 = 15$. A non-priority data flow may be admitted if the following conditions are met:

$$Q_k < Z_k \text{ and } C_k > SP_k, \quad \text{Eq (2)}$$

where $SP_k$ is the number of priority terminals for traffic class k in the neighbor cells.

In the above example with $Q_k = 60\%$ and $F_k = 0.5$, a non-priority data flow may be admitted if the total number of active priority terminals in the neighbor cells is fewer than 15.

The design in equation (2) performs admission control in a manner to support mobility of priority terminals. A given cell x may have information about the presence of active priority terminals in neighbor cells and may use this information for admission control. The condition ($C_k > SP_k$) in equation (2) ensures that there is sufficient reserve capacity in cell x to handle potential handoff of priority terminals in the neighbor cells to cell x. Admission control for cell x may be tightened if there are many priority terminals with active data flows in the neighbor cells and may be loosen otherwise.

The SNRs of priority terminals in the neighbor cells may also be considered for admission control in cell x. For example, there may be many priority terminals in a large neighbor cell, but these priority terminals may be far from the coverage area of cell x. The proximity of each priority terminal to cell x may be reflected in the SNR of cell x as measured at that terminal. In one design, the presence of far-away priority terminals may be discounted, e.g., by using $C_k > SP_k * D_k$, where $D_k$ is a discount factor less than one. In another design, a priority terminal in a neighbor cell may be considered in computing $SP_k$ only if the SNR of cell x as measured at the terminal exceeds an SNR threshold. In yet another design, the "freshness" of SNR measurements available to the cell(s) may be considered for admission control. A terminal may not send SNR reports until and unless a given cell's SNR exceeds a threshold. The terminal may then report the SNRs of the cell that triggered the SNR reporting as well as other neighbor cells that can be measured by the terminal.

In another design, admission control may be performed separately for each group of one or more traffic classes. For example, one group may include real-time services such as VoIP, and another group may include remaining traffic classes. In this design, the loading level may be determined for each group of traffic classes in each cell, as described above, where k is now an index for a group of traffic classes instead of a specific traffic class. In one design, the loading level for a given group may be given by an average queuing delay for all traffic classes in that group as a percentage of the delay requirement of these traffic classes. The average queuing delay for a given group may be expressed as a weighted average of the average queuing delays of the traffic classes in that group. The weight for each traffic class may be determined by the number of active data flows in that traffic class, the number of packets in the queue for the traffic class, etc.

For all designs described above, all traffic classes should approach the congestion point approximately simultaneously. At any given time, the average queuing delay for packets in all traffic classes should be approximately the same percentage of the delay requirement for each traffic class.

Equation (1) shows an example of mapping average queuing delay to reserve capacity. Equation (2) shows an example of admitting a non-priority data flow based on the average queuing delay and the reserve capacity. The reserve capacity computation and/or the admission of non-priority data flows may also consider other factors such as the available frequency spectrum, the total throughput, the required data rate for a new data flow, etc. For example, a video telephony session may have different data flow requirements and may be treated differently than a VoIP session for admission.

For heavy cell loading, admission control may distinguish between different priority levels. For example, the highest priority data flows may be admitted even when the average queuing delay is 100% of the delay requirement, the second highest priority data flows may be admitted only if the average queuing delay is 95% of the delay requirement, etc.

In one design, a data flow may be maintained only if the delay requirement of the data flow can be met and may be terminated otherwise. The data flow may be assigned QoS attributes that may indicate whether the data flow should be dropped if its delay requirement cannot be met. Different flow treatments may be applicable for different priority levels. For example, the highest priority terminals may always have all of their data flows maintained, the second highest priority terminals may have only their high priority data flows maintained, etc.

The techniques described herein may support admission of priority data flows or terminals even during periods of congested traffic conditions. The techniques may also ensure that services offered to priority terminals are minimally impacted and interrupted due to network loading and also as a consequence of user mobility. The techniques may be used to support emergency services for (i) real-time services such as VoIP and video conferencing and (ii) non-real time multimedia services such as downloading of emergency escape route information, accessing websites for up-to-date information on weather, vehicular traffic flow, etc. The techniques may also be used to support different levels of services. For example, a user with a premium subscription may be treated as a priority terminal whereas a user with a general subscription may be treated as a non-priority terminal.

Figure 9:
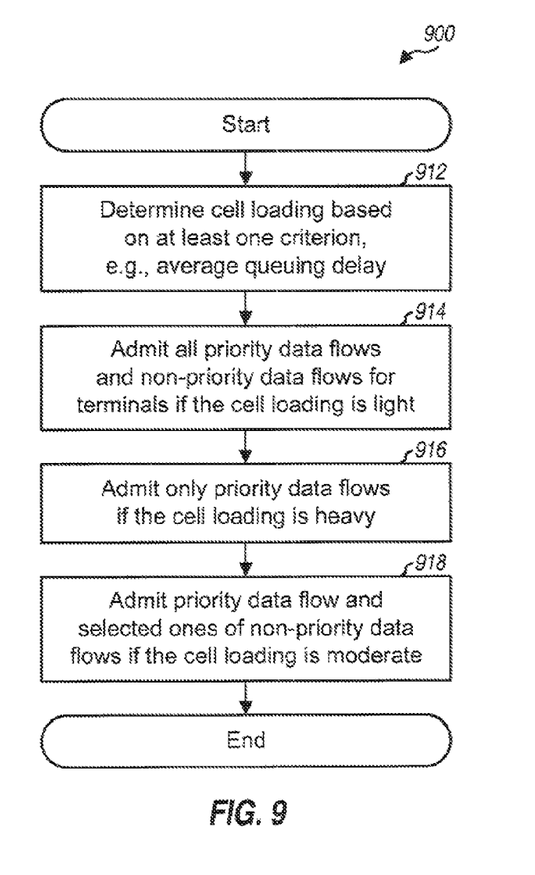
FIG. 9 shows a process for controlling admission.

FIG. 9 shows a design of a process 900 for controlling admission in a communication network. Process 900 may be performed by a cell or a network entity. Cell loading may be determined based on at least one criterion, e.g., average queuing delay of packets to send (block 912). In one design, the cell loading may be declared as (i) light if the average queuing delay is less than a first threshold, (ii) heavy if the average queuing delay is greater than a second threshold, or (iii) moderate if the average queuing delay is between the first and second thresholds. The first and second thresholds may be determined based on first and second percentages of the delay requirement of the packets to send, with the second percentage being higher than the first percentage. The cell loading may also be determined in other manners and/or based on other criteria.

All priority data flows and non-priority data flows for terminals may be admitted if the cell loading is light (block 914).

Whether a data flow is a priority data flow or a non-priority data flow may be determined based on subscription class, QoS attributes of the data flow, and/or other information. Only priority data flows may be admitted if the cell loading is heavy (block 916). Priority data flows and selected ones of non-priority data flows may be admitted if the cell loading is moderate (block 918). In one design of block 918, selected ones of non-priority data flows may be admitted based on the average queuing delay of the packets to send and the number of terminals with priority data flows in neighbor cells, e.g., as shown in equation (2). Some radio resources of the cell may be reserved in case terminals with priority data flows in neighbor cells are handed off to the cell.

Blocks 912 to 918 described above may be for one traffic class or a group of traffic classes aggregated together. In one design, cell loading may be determined for each traffic class based on the at least one criterion, e.g., the average queuing delay for packets in that traffic class. Priority data flows and non-priority data flows for each traffic class may be admitted based on the cell loading for that traffic class, as described above. In another design, cell loading may be determined for each group of traffic classes. Priority data flows and non-priority data flows for each group of traffic classes may be admitted based on the cell loading for that group.

Figure 10:
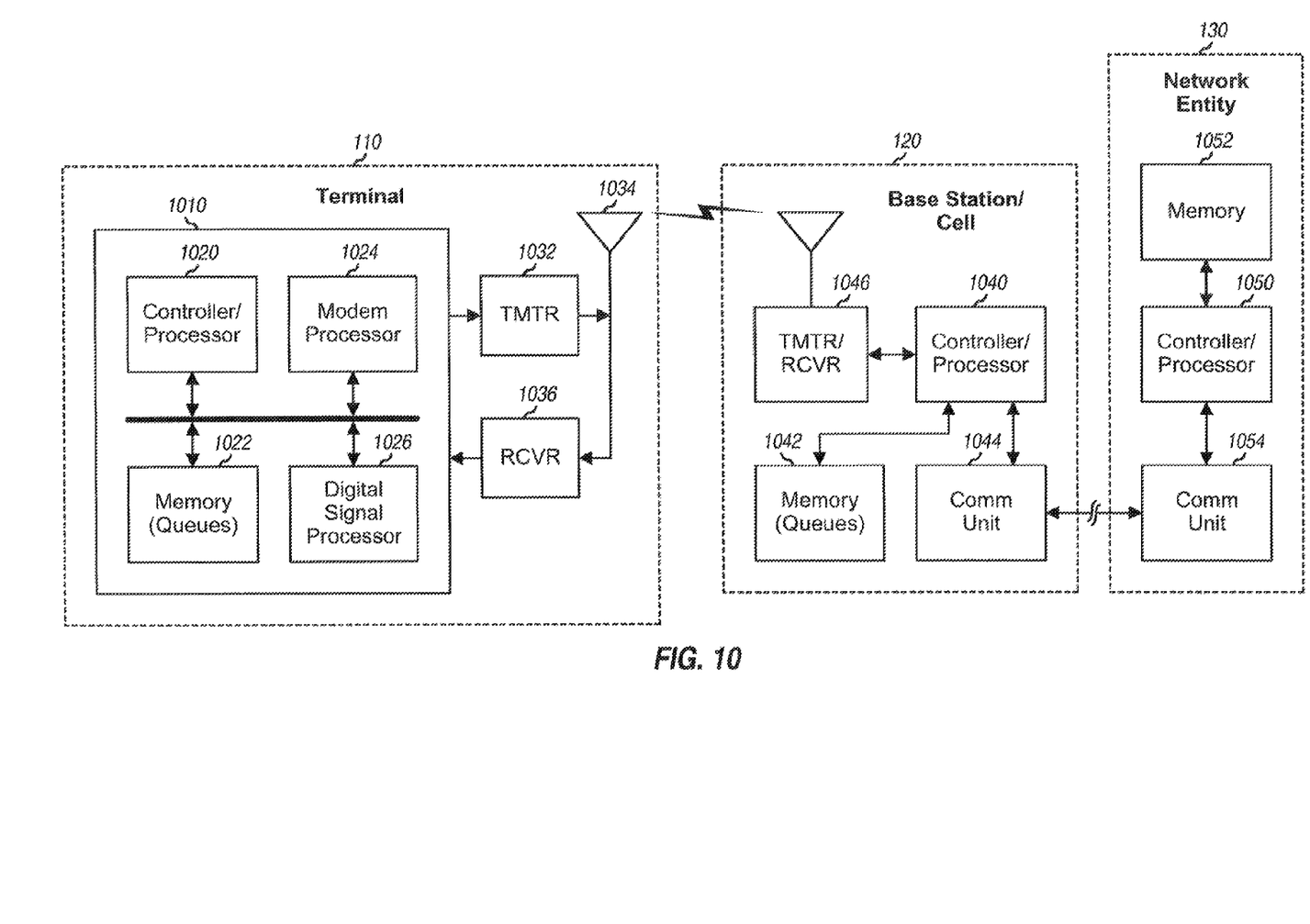
FIG. 10 shows a block diagram of a terminal, a base station, and a network entity.

FIG. 10 shows a block diagram of a design of a terminal 110, a base station 120, and a network entity 130. At terminal 110, a modem processor 1024 may receive data to be sent by the terminal, process (e.g., encode, modulate, spread and scramble) the data, and generate output samples. A transmitter (TMTR) 1032 may condition (e.g., convert to analog, filter, amplify, and frequency upconvert) the output samples and generate a reverse link signal, which may be transmitted via an antenna 1034. On the forward link, antenna 1034 may receive forward link signals from base station 120 and/or other base stations. A receiver (RCVR) 1036 may condition (e.g., filter, amplify, frequency downconvert, and digitize) the received signal from antenna 1034 and provide samples. Modem processor 1024 may process (e.g., demodulate and decode) the samples and provide decoded data. Modem processor 1024 may perform processing in accordance with a radio technology (e.g., CDMA 1X, HRPD, WCDMA, GSM, etc.) utilized by the network.

A controller/processor 1020 may direct the operation at terminal 110. Controller/processor 1020 may perform or direct process 500 in FIG. 5 and/or other processes for the techniques described herein. A memory 1022 may store program codes and data for terminal 110 and may implement one or more queues for one or more traffic classes. A digital signal processor 1026 may perform various types of processing for terminal 110. Processors 1020, 1024 and 1026 and memory 1022 may be implemented on an application specific integrated circuit (ASIC) 1010. Memory 1022 may also be implemented external to the ASIC.

At base station 120, transmitter/receiver (TMTR/RCVR) 1046 may support radio communication with terminal 110 and/or other terminals. A controller/processor 1040 may perform various functions for communication with the terminals. Controller/processor 1040 may also perform or direct process 500 in FIG. 5, process 800 in FIG. 8, process 900 in FIG. 9, and/or other processes for the techniques described herein. A memory 1042 may store program codes and data for base station 120. Memory 1042 may implement one or more queues for one or more traffic classes. A communication (Comm) unit 1044 may support communication with other network entities, e.g., network entity 130. In general, base station 120 may include any number of controllers, processors, memories, transmitters, receivers, communication units, etc.

Network entity 130 may be network controller 122 or IP gateway 124 in FIG. 1 or may be some other network entity. Within network entity 130, a controller/processor 1050 may perform various functions to support various services for terminals. Controller/processor 1050 may perform or direct process 500 in FIG. 5, process 900 in FIG. 9, and/or other processes for the techniques described herein. A memory 1052 may store program codes and data for network entity 130. A communication unit 1054 may support communication with other network entities, e.g., base station 120. In general, network entity 130 may include any number of controllers, processors, memories, communication units, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, a processor configured by computer software, or combinations of both. To clearly illustrate this interchangeability of hardware and a software configured processor, various illustrative components, blocks, modules, circuits, and steps have been described above generally in terms of their functionality. Whether such functionality is implemented as hardware or a processor configured by software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, a processor configured by software, firmware, or any combination thereof. If implemented in a processor configured by software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of sending data in a communication network, comprising:
   receiving a first packet of a first priority level;
   placing the first packet at end of a queue;
   receiving a second packet of a second priority level higher than the first priority level;
   placing the second packet at a first point in the queue ahead of the end of the queue;
   sending packets in the queue in a sequential order;
   maintaining multiple queues for multiple traffic classes, one queue for each traffic class;
   supporting multiple priority levels for each of the multiple traffic classes, the multiple priority levels for each traffic class being associated with different points in the queue for the traffic class; and
   placing each of a plurality of packets in a queue for a traffic class of the packet and at a point in the queue determined by a priority level of the packet.

2. The method of claim 1, further comprising:
   determining a target queuing time for the second priority level; and
   determining the first point in the queue based on the target queuing time.

3. The method of claim 2, wherein the determining the target queuing time comprises determining the target queuing time for the second priority level based on a predetermined percentage of delay requirement of the second packet.

4. The method of claim 2, wherein the determining the target queuing time comprise determining the target queuing time for the second priority level based on a predetermined percentage of an expected queuing delay for the packets in the queue.

5. The method of claim 1, further comprising:
   receiving a third packet of a third priority level higher than the second priority level; and
   placing the third packet at a second point in the queue ahead of the first point.

6. The method of claim 1, further comprising:
   receiving a third packet of one of a plurality of priority levels comprising the first and second priority levels, the plurality of priority levels being associated with different points in the queue;
   determining a point in the queue for the third packet based on the priority level of the packet; and
   placing the third packet at the determined point in the queue.

7. The method of claim 1, further comprising:
   receiving a third packet of a third priority level higher than the second priority level; and
   placing the third packet at the first point in the queue, wherein packets of the third priority level are placed ahead of packets of the second priority level at the first point.

8. The method of claim 1, wherein the first and second packets belong in same traffic class and have quality-of-service (QoS) attributes associated with the traffic class.

9. The method of claim 1, wherein the first and second packets are destined for two terminals.

10. An apparatus for communication, comprising:
    at least one processor; and
    a memory coupled to the at least one processor, wherein the memory stores instructions which configure the processor to receive a first packet of a first priority level, to place the first packet at end of a queue, to receive a second packet of a second priority level higher than the first priority level, to place the second packet at a first point in the queue ahead of the end of the queue, to send packets in the queue in a sequential order, maintain multiple queues for multiple traffic classes, one queue for each traffic class, to support multiple priority levels for each of the multiple traffic classes, the multiple priority levels for each traffic class being associated with different points in the queue for the traffic class, and to place each of a plurality of packets in a queue for a traffic class of the packet and at a point in the queue determined by a priority level of the packet.

11. The apparatus of claim 10, wherein the at least one processor is configured to determine a target queuing time for the second priority level, and to determine the first point in the queue based on the target queuing time.

12. The apparatus of claim 10, wherein the at least one processor is configured to receive a third packet of a third priority level higher than the second priority level, and to place the third packet at a second point in the queue ahead of the first point.

13. An apparatus for communication, comprising:
    means for receiving a first packet of a first priority level;
    means for placing the first packet at end of a queue;

means for receiving a second packet of a second priority level higher than the first priority level;
means for placing the second packet at a first point in the queue ahead of the end of the queue;
means for sending packets in the queue in a sequential order;
means for maintaining multiple queues for multiple traffic classes, one queue for each traffic class;
means for supporting multiple priority levels for each of the multiple traffic classes, the multiple priority levels for each traffic class being associated with different points in the queue for the traffic class; and
means for placing each of a plurality of packets in a queue for a traffic class of the packet and at a point in the queue determined by a priority level of the packet.

14. The apparatus of claim 13, further comprising:
means for determining a target queuing time for the second priority level; and
means for determining the first point in the queue based on the target queuing time.

15. The apparatus of claim 13, further comprising:
means for receiving a third packet of a third priority level higher than the second priority level; and
means for placing the third packet at a second point in the queue ahead of the first point.

16. A computer program product, comprising:
a non-transitory computer-readable medium comprising:
code for causing at least one computer to receive a first packet of a first priority level;
code for causing the at least one computer to place the first packet at end of a queue;
code for causing the at least one computer to receive a second packet of a second priority level higher than the first priority level;
code for causing the at least one computer to place the second packet at a first point in the queue ahead of the end of the queue;
code for causing the at least one computer to send packets in the queue in a sequential order;
code for causing the at least one computer to maintain multiple queues for multiple traffic classes, one queue for each traffic class;
code for causing the at least one computer to support multiple priority levels for each of the multiple traffic classes, the multiple priority levels for each traffic class being associated with different points in the queue for the traffic class; and
code for causing the at least one computer to place each of a plurality of packets in a queue for a traffic class of the packet and at a point in the queue determined by a priority level of the packet.

17. The computer program product of claim 16, wherein the non-transitory computer-readable medium further comprises:
code for causing the at least one computer to determine a target queuing time for the second priority level; and
code for causing the at least one computer to determine the first point in the queue based on the target queuing time.

18. The computer program product of claim 16, wherein the non-transitory computer-readable medium further comprises:
code for causing the at least one computer to receive a third packet of a third priority level higher than the second priority level; and
code for causing the at least one computer to place the third packet at a second point in the queue ahead of the first point.

19. A method of sending data in a communication network, comprising:
receiving from a first cell a packet to send to a terminal;
determining amount of time the packet has already waited in a first queue at the first cell;
placing the packet in a second queue at a second cell, the packet being placed at a point in the second queue to account for the amount of time the packet has already waited in the first queue; and
sending the packet to the terminal when the packet reaches head of the second queue.

20. The method of claim 19, wherein the placing the packet in the second queue comprises
determining remaining target queuing time for the packet based on a target queuing time for the packet and the amount of time the packet has already waited in the first queue, and
placing the packet at the point in the second queue determined based on the remaining target queuing time for the packet.

21. The method of claim 19, wherein the packet is placed at end of the first queue when received by the first cell.

22. The method of claim 19, wherein the packet is placed at a point in the first queue determined based on a priority level of the packet.

23. The method of claim 19, wherein the packet is retained by the first cell until delay requirement of the packet has passed.

24. An apparatus for communication, comprising:
at least one processor; and
a memory coupled to the at least one processor, wherein the memory stores instructions which configure the processor to receive from a first cell a packet to send to a terminal, to determine amount of time the packet has already waited in a first queue at the first cell, to place the packet in a second queue at a second cell, the packet being placed at a point in the second queue to account for the amount of time the packet has already waited in the first queue, and to send the packet to the terminal when the packet reaches head of the second queue.

25. The apparatus of claim 24, wherein the at least one processor is configured to determine remaining target queuing time for the packet based on a target queuing time for the packet and the amount of time the packet has already waited in the first queue, and to place the packet at the point in the second queue determined based on the remaining target queuing time for the packet.

26. A method of controlling admission in a communication network, comprising:
determining cell loading based on at least one criterion, wherein the at least one criterion comprises defining a threshold for an average queuing delay based on a traffic class;
admitting all priority data flows and non-priority data flows if the cell loading is light;
admitting only priority data flows if the cell loading is heavy; and
admitting priority data flows and selected ones of non-priority data flows if the cell loading is moderate.

27. The method of claim 26, wherein the determining the cell loading comprises
determining average queuing delay of packets to send, and
determining the cell loading based on the average queuing delay.

28. The method of claim 27, wherein the determining the cell loading further comprises declaring the cell loading as light if the average queuing delay is less than a first threshold, declaring the cell loading as heavy if the average queuing delay is greater than a second threshold, and declaring the cell loading as moderate if the average queuing delay is between the first and second thresholds.

29. The method of claim 28, wherein the first and second thresholds are determined based on first and second percentages of delay requirement of the packets to send, the second percentage being higher than the first percentage.

30. The method of claim 26, wherein the admitting priority data flows and selected ones of non-priority data flows if the cell loading is moderate comprises admitting selected ones of non-priority data flows based on average queuing delay of packets to send and number of priority terminals in neighbor cells.

31. The method of claim 26, further comprising:

reserving radio resources of a cell for possible handoff of terminals with priority data flows in neighbor cells to the cell.

32. The method of claim 26, further comprising:

determining whether a data flow is a priority data flow or a non-priority data flow based on quality-of-service (QoS) attributes of the data flow or a subscription class for the data flow.

33. The method of claim 26, further comprising:

determining cell loading for each group of at least one traffic class based on the at least one criterion; and admitting priority data flows and non-priority data flows in each group of at least one traffic class based on the cell loading for the group of at least one traffic class.

34. The method of claim 33, wherein the determining cell loading for each group of at least one traffic class comprises determining average queuing delay of packets in each group of at least one traffic class, and determining the cell loading for each group of at least one traffic class based on the average queuing delay for the group of at least one traffic class.

35. An apparatus for communication, comprising:

at least one processor; and a memory coupled to the at least one processor, wherein the memory stores instructions which configure the processor to:

determine cell loading based on at least one criterion, wherein the at least one criterion comprises defining a threshold for an average queuing delay based on a traffic class;

admit all priority data flows and non-priority data flows if the cell loading is light;

admit only priority data flows if the cell loading is heavy; and admit priority data flows and selected ones of non-priority data flow if the cell loading is moderate.

36. The apparatus of claim 35, wherein the at least one processor is configured to determine average queuing delay of packets to send, and to determine the cell loading based on the average queuing delay.

37. The apparatus of claim 36, wherein the at least one processor is configured to declare the cell loading as light if the average queuing delay is less than a first threshold, to declare the cell loading as heavy if the average queuing delay is greater than a second threshold, and to declare the cell loading as moderate if the average queuing delay is between the first and second thresholds.

38. The apparatus of claim 35, wherein the at least one processor is configured to determine cell loading for each group of at least one traffic class based on the at least one criterion, and to admit priority data flows and non-priority data flows in each group of at least one traffic class based on the cell loading for the group of at least one traffic class.

39. The apparatus of claim 38, wherein the at least one processor is configured to determine average queuing delay of packets in each group of at least one traffic class, and to determine the cell loading for each group of at least one traffic class based on the average queuing delay for the group of at least one traffic class.

* * * * *